Dec. 28, 1926.

R. G. WEISSEL

SHIFT LEVER LOCK

Filed Dec. 22, 1924     2 Sheets-Sheet 1

1,612,244

Inventor
Robert G. Weissel
by  M. C. Frank
    Attorney

Dec. 28, 1926.
R. G. WEISSEL
SHIFT LEVER LOCK
Filed Dec. 22, 1924

Inventor
Robert G. Weissel
by M. C. Frank
Attorney.

Patented Dec. 28, 1926.

1,612,244

UNITED STATES PATENT OFFICE.

ROBERT G. WEISSEL, OF OAKLAND, CALIFORNIA.

SHIFT-LEVER LOCK.

Application filed December 22, 1924. Serial No. 757,348.

My invention relates to shift-lever locks, and more particularly to locks for the gear-shift lever of automobiles, for rendering the transmission of the same inoperative against unauthorized use of the car. Broadly, the invention consists of a unit to be attached to the shift lever of an automobile to lock the said lever in its neutral position when desired.

To this end I have designed and constructed a device, as a separate article of manufacture, applicable to any of the universal types of gear-shift levers, without changing or altering any of the parts of the lever assembly thereof.

For convenience of illustration and description, I have shown the device in connection with the transmission-case cover and gear-shift lever of the "Chevrolet" automobile, although it is applicable to other makes of cars as above mentioned.

In applying the device to the "Chevrolet" transmission cover it is necessary to remove the retaining ring (not shown) from the frusto-conical top thereof that houses the shift lever, and in which housing the shift lever is fulcrumed. My locking unit replaces this ring, and the same holding screws for the ring are used in conjunction with my lock.

This invention consists of a locking member adapted to be rigidly attached by a set screw or the like to the shift lever, and has a socket therein for engagement with a ball bearing member attached to the top of the said housing by the screws above mentioned. The locking unit is adapted to move with said shift lever, and the socket thereof adapted to oscillate upon the ball surface of the bearing member.

The primary object of this invention is to construct a simple, durable and efficient lock of the character described at a minimum cost, and which may be easily applied to the various makes of cars without changing the construction thereof.

Another object is to construct a device which may be readily applied to the gear-shift lever and above the floor boards of the car, and within easy access of the driver and operable by pressing a button to lock the same.

In addition to the above broader features of the invention, there are certain details of design, whereby compactness, durability of structure, and positiveness and ease of operation are attained, and which details are shown on the accompanying two sheets of drawings illustrating the present embodiment of my invention.

Figure 1 of the said drawings is a plan of the cover of the transmission case showing my invention in place thereon and secured to the control lever.

Figure 2:
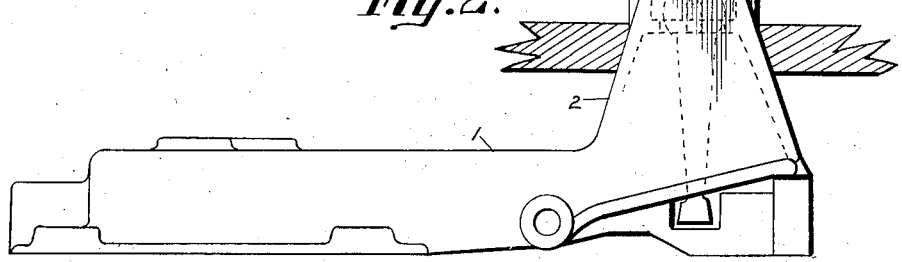
Fig. 2 is a side elevation of Fig. 1 showing the relation of the device to the floor boards of the automobile.

Referring to the drawings and figures thereof in detail: The numeral 1 represents the cover of an ordinary transmission case, having a frusto-conical housing forming the gear-shift lever support as indicated at 2, Fig. 2. The shift or control lever 3 is of ordinary construction with the ball 4 formed thereon and fulcrumed in the socket 5 of the housing 2, Fig. 4.

A bearing member 6 having a spherical upper face 7, is secured to the end of the housing by the car's own screws 8. The member has a central opening 9 of larger diameter than the shift lever 3, to allow it to slip over the end of the latter when its handle 10 is unscrewed therefrom. The control lever 3 which is fulcrumed in the socket 5 of the housing 2 as at 11, carries the locking member 12 by virtue of the set screw 13, shown clearly in Fig. 3. The said member is adapted to freely oscillate upon the spherical surface 7 of the supporting member 6 when the control lever is moved to shift gears.

Figure 1:
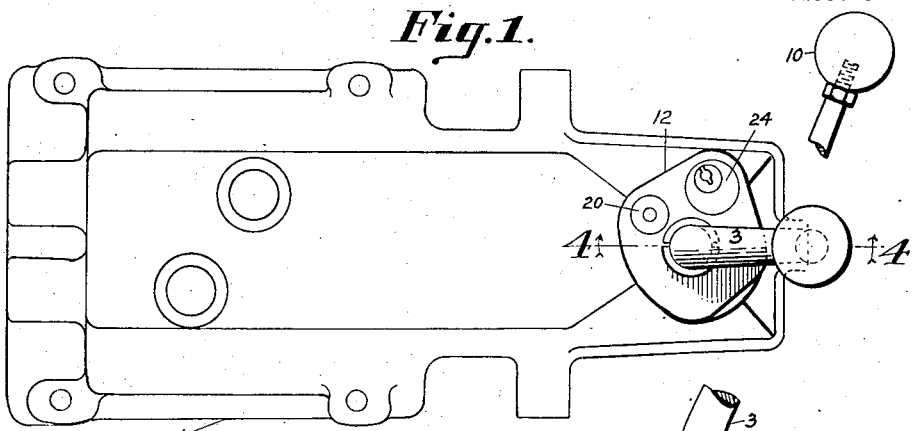
Figure 3:
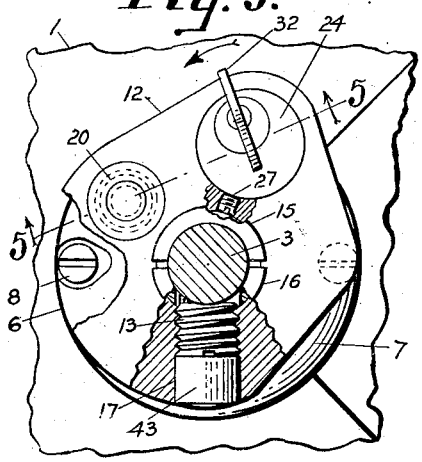
Fig. 3 is an enlarged plan of the lock, the control lever being shown in section and taken upon line 3—3 of Fig. 2, parts of the lock being broken away for clearness of illustration of other parts.
Figure 4:
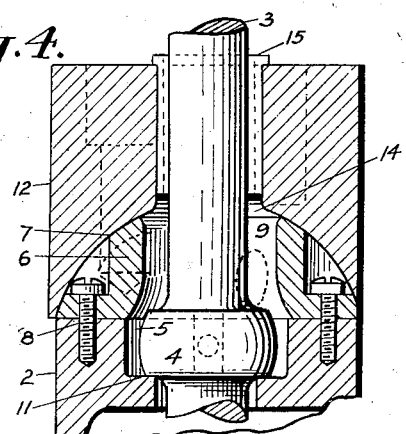
Fig. 4 is a vertical mid-section taken upon the line 4—4 of Fig. 1.

The locking member 12 consists of a casting having a spherical socket formed in its lower end, and a vertical bore 14 extending therethrough for the reception of the control lever 3. Halved bushings 15 and 16 fit within the bore 14 to snugly embrace the control lever as shown in Figs. 1, 3 and 4. The bore 14 is made larger than the diameter of the control lever 3, so that the said member 12 may be readily applied over said lever similar to the bearing member 6, and the bushings 15 and 16 are inserted between said member 12 and the control lever to fill the space. A transverse hole 17 is drilled through one side of the member 12 and tapped for the reception of said set screw 13; and a registering hole is likewise formed in bushing 16 to allow the said set screw to be tightened against the control lever 3, to hold member 12 rigidly in place with said control lever as an integral unit.

Figure 5:
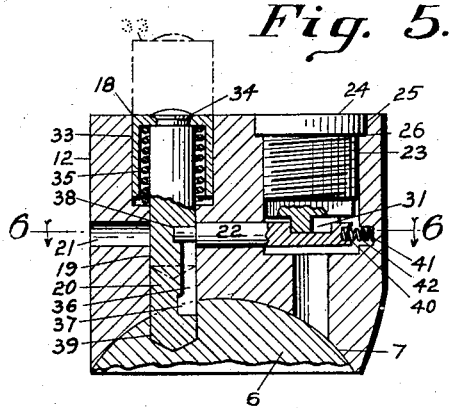
Fig. 5 is a vertical section of the locking member, and portion of the bearing member taken upon the line 5—5 of Fig. 3; the dot-and-dash lines show the push button released.
Figure 6:
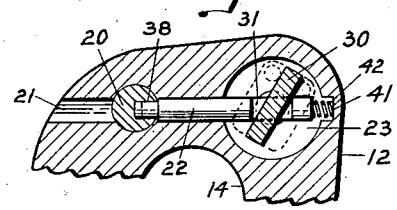
Fig. 6 is a horizontal sectional detail taken upon the line 6—6 of Fig. 5, showing the sliding pin.
Figure 7:
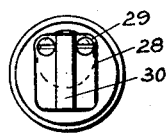
Fig. 7 is a bottom plan of the cylinder lock and cam thereon for moving the sliding pin.
Figure 8:
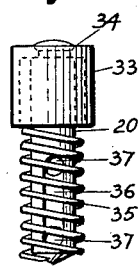
Fig. 8 is an elevation of the bolt removed from the locking member, and turned at 90 degrees from the position shown in Fig. 5.

An opening 18 is drilled in the upper part of member 12, Fig. 5, and parallel with the bore 14, and a second opening 19 of smaller diameter is drilled on through said member and concentric with the opening 18, for the reception of a locking bolt 20. A third opening 21 is drilled from the circumferential face of member 12 to near the opposite face thereof as shown in Figs. 5 and 6, and this opening is of smaller diameter than the openings 18 and 19 and at right angles thereto and adapted to receive a sliding pin 22.

Another opening 23 is drilled from the top face of member 12, adjacent to and parallel with bore 14 for the reception of a cylinder lock 24, the upper rim 25 thereof resting upon the shoulder 26 formed concentric to the opening 23. A small set screw 27, Fig. 3, bears against the barrel of the lock 24 to secure the same rigidly in member 12.

An actuating cam 28 is secured to the lower end of said key cylinder by screws 29, and as a rib 30 formed thereon to engage the sliding pin 22, which latter has a cut-away section 31 to receive said rib 30. A key 32 operates said cylinder lock and cam 28 thereon.

The locking bolt 20 is adapted to operate vertically in the opening 19 and is provided at its upper end with an inverted cylindrical cup 33 riveted to said bolt as at 34. The cup forms a housing for the compression spring 35 encircling the upper end of said bolt. The cup freely fits within the opening 18 and is adapted to operate therein. The lower end of bolt 20 is provided with a vertical groove 36 having a hole 37 at each end thereof, to receive the reduced end 38 formed at the outer end of the sliding pin 22. A hole 39 is drilled in the bearing member 6 to receive the lower end of the bolt 20 when the locking member and the shift lever are in neutral position. As clearly shown in Fig. 5 the bearing member 6 and locking member 12 are in locked position with the bolt 20 projected into the hole 39.

The sliding pin 22 is provided with the said reduced end 38, and at the other end with a shallow hole 40 registering with a similar hole 41 from the bore 23 in the locking member. The two holes house the small compression spring 42 which exerts outward pressure on said sliding pin to hold the pintle 38 thereof within the holes 37 or groove 36 of the locking bolt 20.

Referring to Fig. 3 it is obvious that by turning the key 32 in the direction of the arrow shown, the actuating cam 28 of the cylinder lock, Figs. 5 and 6, will be turned thereby, moving the pin 22 out of engagement with the hole 37 of the bolt 20, thereby allowing said bolt to move upwardly under pressure of its compressed spring 35, until the reduced end 38 of the pin 22 engages in the lower hole 37, thereby releasing the locking member 12 from the bearing member 6, thus allowing the free movement of the control lever 3 to shift the gears.

When it is desired to again lock the control lever 3 in neutral position, the raised push button 33 shown in dot-and-dash lines Fig. 5 is pressed downwardly by the finger or foot of the operator until the reduced end 38 of pin 22 snaps into locking engagement in the bolt 20 as shown in full lines. It should be observed that the lower hole 37 is shallower than the upper hole 37, so that only a light pressure on the push button is sufficient to release the reduced end of the pin from its engagement in the lower hole.

After the set screw 13 has been screwed tightly in place against the control lever 3 as shown in Fig. 3, a smooth and hardened pin 43 is driven in the threaded opening 17 and against said set screw, stripping the threads therein, thus preventing anyone from reaching the said set screw to render the device unserviceable as a lock.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired, as fall within the scope of the appended claims.

Having thus described my invention, what I claim as new and desire to secure by Letters Patent of the United States, is the following:

1. A shift-lever lock comprising a bearing member provided with a hole therein; a locking member oscillatively mounted on the bearing member; a bolt slidably mounted in the locking member and normally projecting with one end outside thereof and being adapted to project with its other end into said hole for locking the locking member to the bearing member, said bolt having a groove longitudinally therein; a compression spring around said bolt for normally holding the bolt in its unlocked position; and a key-controlled, spring-actuated pin mounted in the locking member so as to slide in or out of engagement with said groove and being adapted to lockingly engage the bolt for holding it either in a locked or an unlocked position, the groove being so arranged that only a light pressure on said normally projecting end of the bolt is sufficient to release said pin from its locking engagement with the bolt when the bolt is in its unlocked position.

2. In combination with an engine transmission cover and shift-lever therefor, a housing on said cover through which the shift-lever projects, a ball-shaped bearing member fitted to said housing around said shift-lever, means for anchoring said bearing member to said housing comprising countersunk bolts connecting the bearing member with the housing, a ball-socket locking member anchored to the shift-lever and adapted to fit over the bearing member and cover the anchoring means therefor, and means for locking the locking member to said bearing member comprising a sliding bolt in the locking member adapted to engage an opening in the bearing member provided therefor, said sliding bolt having a spring associated therewith to normally project one end of the bolt out of the locking member, and means for holding the bolt in locking engagement against the influence of said spring comprising a key controlled pin mounted in the locking member and adapted to engage a groove in the sliding bolt provided therefor, said groove being so arranged that only a light pressure on the normally projecting end of the bolt is sufficient to release said pin from its locking engagement with the bolt when the bolt is in its unlocked position.

In testimony whereof I affix my signature.

ROBERT G. WEISSEL.